United States Patent
Sun et al.

(10) Patent No.: US 9,334,395 B2
(45) Date of Patent: May 10, 2016

(54) THERMOPLASTIC POLYMER BLENDS COMPRISING DYNAMICALLY CROSSLINKED POLYURETHANE IN AN OLEFIN POLYMER MATRIX

(75) Inventors: Yabin Sun, Shanghai (CN); Xiang Yang Tai, Shanghai (CN); Li Qiang Fan, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 444 days.

(21) Appl. No.: 13/513,400

(22) PCT Filed: Dec. 11, 2009

(86) PCT No.: PCT/CN2009/075514
§ 371 (c)(1),
(2), (4) Date: Jun. 1, 2012

(87) PCT Pub. No.: WO2011/069302
PCT Pub. Date: Jun. 16, 2011

(65) Prior Publication Data
US 2012/0238689 A1  Sep. 20, 2012

(51) Int. Cl.
| | |
|---|---|
| C08G 18/08 | (2006.01) |
| C08L 75/00 | (2006.01) |
| C08F 8/30 | (2006.01) |
| C08L 23/02 | (2006.01) |
| C08L 75/08 | (2006.01) |
| C08L 23/06 | (2006.01) |
| C08L 23/08 | (2006.01) |
| C08L 23/26 | (2006.01) |
| C08L 33/12 | (2006.01) |
| C08L 51/06 | (2006.01) |
| C08L 61/06 | (2006.01) |

(52) U.S. Cl.
CPC ............... *C08L 23/02* (2013.01); *C08L 75/08* (2013.01); *C08L 23/06* (2013.01); *C08L 23/0869* (2013.01); *C08L 23/26* (2013.01); *C08L 33/12* (2013.01); *C08L 51/06* (2013.01); *C08L 61/06* (2013.01); *C08L 2205/08* (2013.01); *C08L 2312/04* (2013.01)

(58) Field of Classification Search
None
See application file for complete search history.

(56) References Cited

U.S. PATENT DOCUMENTS

| | | | |
|---|---|---|---|
| 4,311,628 A | 1/1982 | Abdou-Sabet et al. | |
| 4,385,133 A | 5/1983 | Alberino et al. | |
| 4,522,975 A | 6/1985 | O'Connor et al. | |
| 4,857,600 A | 8/1989 | Gross et al. | |
| 4,883,837 A | 11/1989 | Zabrocki | |
| 5,167,899 A | 12/1992 | Jezic | |
| 5,272,236 A | 12/1993 | Lai et al. | |
| 5,278,272 A | 1/1994 | Lai et al. | |
| 5,575,965 A | 11/1996 | Caronia et al. | |
| 5,605,961 A | 2/1997 | Lee et al. | |
| 5,623,019 A | 4/1997 | Wiggins et al. | |
| 5,952,425 A * | 9/1999 | Medsker et al. | 525/133 |
| 5,986,028 A | 11/1999 | Lai et al. | |
| 6,291,587 B1 | 9/2001 | Bleys et al. | |
| 6,368,700 B1 | 4/2002 | Venkataswamy et al. | |
| 6,404,971 B2 | 6/2002 | Mehl | |
| 6,414,081 B1 | 7/2002 | Ouhadi | |
| 6,476,134 B1 | 11/2002 | Bolz et al. | |
| 7,151,134 B2 | 12/2006 | Park et al. | |
| 7,355,089 B2 | 4/2008 | Chang et al. | |
| 2004/0260023 A1 | 12/2004 | Park et al. | |
| 2005/0107550 A1* | 5/2005 | Agrawal | C08L 23/0815 525/452 |
| 2006/0199910 A1 | 9/2006 | Walton et al. | |
| 2007/0129493 A1* | 6/2007 | Sahnoune et al. | 525/191 |
| 2007/0265387 A1 | 11/2007 | James et al. | |

FOREIGN PATENT DOCUMENTS

| | | |
|---|---|---|
| CN | 1275998 | 12/2000 |
| CN | 1709959 | 12/2005 |
| EP | 0569746 | 4/1993 |
| EP | 1101797 B1 | 1/2005 |
| JP | 10226750 | 8/1998 |
| JP | 2001253980 | 9/2001 |
| JP | 2003-321580 A | 11/2003 |
| JP | 2004-203920 A | 7/2004 |
| WO | 2009076768 | 6/2009 |

OTHER PUBLICATIONS

International Search Report mailed on Sep. 16, 2010 for PCT App. No. PCT/CN2009/075514.

* cited by examiner

*Primary Examiner* — Susannah Chung
*Assistant Examiner* — Robert T Butcher
(74) *Attorney, Agent, or Firm* — Whyte Hirschboeck Dudek S.C.

(57) ABSTRACT

Compatibilized blends comprising a first phase comprising a thermoplastic olefin polymer and a second phase comprising a crosslinked, thermoplastic polyurethane are provided. The first phase is a continuous phase and the second phase can be co-5 continuous with the first phase, or dispersed as a non-continuous phase in the first phase. The blends further include a phenolic resole resin which at least partially crosslinks the thermoplastic polyurethane and acts as a compatibilizer for the olefin polymer and the thermoplastic polyurethane.

9 Claims, No Drawings

THERMOPLASTIC POLYMER BLENDS COMPRISING DYNAMICALLY CROSSLINKED POLYURETHANE IN AN OLEFIN POLYMER MATRIX

FIELD OF THE INVENTION

This invention relates to thermoplastic compositions comprising a discontinuous or co-continuous rubber phase comprising thermoplastic polyurethane in a continuous olefin polymer matrix, and further relates to articles made from the thermoplastic compositions and methods for making the thermoplastic compositions.

BACKGROUND OF THE INVENTION

Conventional thermoplastic vulcanizates (TPVs) comprise polypropylene as a continuous phase and crosslinked ethylene propylene diene monomer (EPDM) as a dispersed phase. Using thermoplastic polymers, like polypropylene (PP), as the matrix provides the TPVs with good processability and improved heat resistance, while crosslinked EPDM provides the TPVs with an elastomeric character. Extender oil can be added into the TPV and absorbed into the crosslinked EPDM to adjust hardness. Since most of the components in conventional TPVs are polyolefin-based (non-polar), it is difficult to accommodate polar flame retardant (FR) ingredients in the TPVs. Therefore, it is difficult to achieve a good balance between FR performance and mechanical properties. Compared with polyolefin-based polymers, thermoplastic polyurethane (TPU) is able to accommodate more FR ingredients such as metal hydrates and phosphorous-based FRs. In some applications, TPU together with FR ingredients are used as a FR package for blending with a polyolefin (PO). However, the compatibility between TPU and polyolefins is not good enough, especially when a large amount of FR ingredients are added. To improve compatibility and mechanical properties, commonly used methods include incorporating reactive compatibilizers, such as amine or hydroxyl functionalized POs, into TPU/PO blends. But the effectiveness of this approach is very limited in practice.

BRIEF SUMMARY OF THE INVENTION

One aspect of the invention provides a compatibilized blend comprising a continuous phase comprising a thermoplastic olefin polymer, a dispersed or co-continuous phase comprising a crosslinked, thermoplastic polyurethane dispersed in the continuous phase or co-continuous with the continuous phase; and a phenolic resole resin crosslinking the thermoplastic polyurethane, wherein the phenolic resole resin acts as a compatibilizer for the thermoplastic olefin polymer and the polyurethane. Articles comprising the blend are also provided. In some embodiments, the thermoplastic olefin polymer is a non-polar olefin polymer. In some embodiments, the thermoplastic olefin polymer is an ethylene-based polymer.

The compatibilized blends can further comprise at least one flame retardant and/or at least one additional compatibilizer.

In some embodiments, the phenolic resole resin has the following structure:

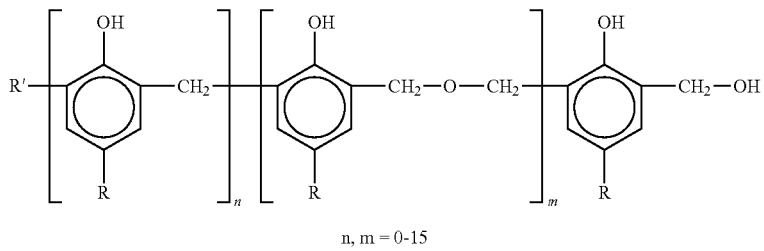

n, m = 0-15 wherein n and m=0-15, R' is an H atom or a CH$_2$OH group and R is an alkyl group.

In some embodiments, the blend comprises 5 to 75 weight percent thermoplastic olefin polymer, based on the total weight of the blend, 5 to 75 weight percent thermoplastic polyurethane, based on the total weight of blend, and 0.1 to 10 weight percent phenolic resole resin, based on the total weight of blend.

Another aspect of the invention provides a method of making a compatibilized blend, the method comprising mixing a thermoplastic olefin polymer, a thermoplastic polyurethane and a phenolic resole resin and crosslinking the thermoplastic polyurethane with the phenolic resole resin with continuous mixing. The method can further comprise mixing a functionalized olefin compatibilizer with the thermoplastic olefin polymer, the thermoplastic polyurethane and the phenolic resole resin.

DETAILED DESCRIPTION

One aspect of the invention provides a compatibilized blend comprising a first phase comprising a thermoplastic olefin polymer matrix and a second phase comprising a crosslinked, thermoplastic polyurethane. The first phase is a continuous phase and the second phase can be co-continuous with the first phase, or dispersed as a non-continuous phase in the first phase. The blends further include a phenolic resole resin which at least partially crosslinks the thermoplastic polyurethane and acts as a compatibilizer for the olefin polymer and the thermoplastic polyurethane. The mechanical properties of the present blends can be significantly improved compared with blends of olefin polymers and thermoplastic polyurethanes that do not include a compatibilizer, or that use a reactive compatibilizer. The blends may also be referred to as compositions, where "composition", "blend" and like terms mean a mixture or blend of two or more components.

The term "polymer" which is use throughout this disclosure means a polymeric compound prepared by polymerizing monomers, whether of the same or a different type. The generic term polymer thus embraces the term homopolymer, usually employed to refer to polymers prepared from only one type of monomer, and the term interpolymer. It also embraces all forms of interpolymers, e.g., random, block, homogeneous, heterogeneous, etc.

Continuous Phase—Olefin Polymers

The continuous phase of the present blends includes at least one thermoplastic olefin polymer, which is desirably a non-polar thermoplastic polyolefin. Using a polyolefin in the thermoplastic matrix is advantageous because it can provide chemical resistance, UV resistance and volume electronic resistance.

"Olefin polymer", "olefinic polymer", "olefinic interpolymer", "polyolefin" and like terms mean a polymer derived from simple α-olefins. Suitable thermoplastic polyolefins include both olefin homopolymers and interpolymers. "interpolymer" means a polymer prepared by the polymerization of at least two different monomers. The interpolymers can be random, block, homogeneous, heterogeneous, etc. This generic term includes copolymers, usually employed to refer to polymers prepared from two different monomers, and polymers prepared from more than two different monomers, e.g., terpolymers, tetrapolymers, etc.

Examples of olefin homopolymers are the homopolymers of ethylene (polyethylene) and propylene (polypropylene). Included in the polyethylenes are high density polyethylenes (HDPEs) and low density polyethylenes (LDPEs). HDPEs include those made by polymerizing ethylene monomers using Ziegler-Natta coordination catalysts to provide linear high density polyethylenes having densities of 0.941 to 0.965 gms/cc. LDPEs include those made by polymerizing ethylene monomers using free-radical catalysts to provide branched polyethylenes with densities of 0.910 to 0.935 gms/cc. Examples of HDPEs include HDPE DGDB-2480, available from Sinopec Qilu Co., and HDPE 12450N, available from the Dow Chemical Company.

Examples of the olefin interpolymers are the ethylene/α-olefin interpolymers and the propylene/α-olefin interpolymers. The α-olefin is preferably a $C_{2-20}$ linear, branched or cyclic α-olefin (for the propylene and high olefin/α-olefin interpolymers, ethylene is considered an α-olefin). Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins can also contain a cyclic structure such as cyclohexane or cyclopentane, resulting in an α-olefin such as 3-cyclohexyl-1-propene (allyl cyclohexane) and vinyl cyclohexane. Although not α-olefins in the classical sense of the term, for purposes of this invention certain cyclic olefins, such as norbornene and related olefins, are α-olefins and can be used in place of some or all of the α-olefins described above. Similarly, styrene and its related olefins (for example, α-methylstyrene, etc.) are α-olefins for purposes of this invention. Illustrative polyolefin copolymers include ethylene/propylene, ethylene/butene, ethylene/1-hexene, ethylene/1-octene, ethylene/styrene, and the like. Illustrative terpolymers include ethylene/propylene/1-octene, ethylene/propylene/butene, ethylene/butene/1-octene, and ethylene/butene/styrene. The copolymers can be random or blocky.

More specific examples of olefin interpolymers useful in this invention include very low density polyethylene (VLDPE) (e.g., FLEXOMER® ethylene/1-butene polyethylene made by The Dow Chemical Company), homogeneously branched, linear ethylene/α-olefin copolymers (e.g. TAFMER® by Mitsui Petrochemicals Company Limited and EXACT® by Exxon Chemical Company), homogeneously branched, substantially linear ethylene/α-olefin polymers (e.g., AFFINITY® polyolefin plastomers and ENGAGES polyolefin elastomers available from The Dow Chemical Company), and olefin block copolymers such as those described in U.S. Pat. No. 7,355,089 (e.g., INFUSE® available from The Dow Chemical Company). The more preferred polyolefin copolymers are the homogeneously branched linear and substantially linear ethylene copolymers. The substantially linear ethylene copolymers are especially preferred, and are more fully described in U.S. Pat. Nos. 5,272,236, 5,278,272 and 5,986,028.

The olefin copolymers of this category of thermoplastic polymers also include propylene, butene and other alkene-based copolymers, e.g., copolymers comprising a majority of units derived from propylene and a minority of units derived from another α-olefin (including ethylene). Exemplary propylene polymers useful in the practice of this invention include the VERSIFY® polymers available from The Dow Chemical Company, and the VISTAMAXX® polymers available from ExxonMobil Chemical Company.

In some embodiments, the olefin polymer of the continuous phase is an ethylene polymer. "Ethylene polymer", "polyethylene", "ethylene-based polymer" and like terms mean a polymer containing units derived from ethylene. Ethylene-based polymers typically comprises at least 50 mole percent (mol %) units derived from ethylene.

Blends of one or more of the olefin polymers, including all of the examples listed above, can also be used in the continuous phase of the present blends.

The olefin polymers useful in the practice of this invention, are typically used in amounts ranging from 1 to 99 weight percent (wt %) based on the weight of the blend. This includes embodiments in which the olefin polymers are used in an amount ranging from 5 to 75 wt %, based on the weight of the blend.

Co-Continuous or Dispersed Phase—Thermoplastic Polyurethane

The co-continuous, or dispersed, phase includes at least one crosslinked thermoplastic polyurethane. Using a polyurethane is advantageous because it allows for the accommodation of polar flame retardants, thereby making flame-retardant blends with good mechanical properties possible.

A "thermoplastic polyurethane" (or "TPU"), as used herein, is the reaction product of a di-isocyanate, one or more polymeric diol(s), and optionally one or more difunctional chain extender(s). The TPU may be prepared by the prepolymer, quasi-prepolymer, or one-shot methods. The di-isocyanate forms a hard segment in the TPU and may be an aromatic, an aliphatic, and a cycloaliphatic di-isocyanate and combinations of two or more of these compounds. A nonlimiting example of a structural unit derived from di-isocyanate (OCN—R—NCO) is represented by formula (I) below:

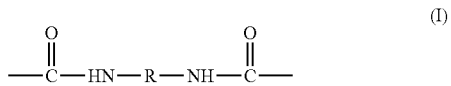

(I)

in which R is an alkylene, cycloalkylene, or arylene group. Representative examples of these di-isocyanates can be found in U.S. Pat. Nos. 4,385,133, 4,522,975 and 5,167,899. Non-limiting examples of suitable di-isocyanates include 4,4'-di-isocyanatodiphenyl-methane, p-phenylene di-isocyanate, 1,3-bis(isocyanatomethyl)-cyclohexane, 1,4-di-isocyanato-cyclohexane, hexamethylene di-isocyanate, 1,5-naphthalene di-isocyanate, 3,3'-dimethyl-4,4'-biphenyl di-isocyanate, 4,4'-di-isocyanato-dicyclohexylmethane, 2,4-toluene di-isocyanate, and 4,4'-di-isocyanato-diphenylmethane.

The polymeric diol forms soft segments in the resulting TPU. The polymeric diol can have a molecular weight (number average) in the range, for example, from 200 to 10,000 g/mole. More than one polymeric diol can be employed.

Nonlimiting examples of suitable polymeric diols include polyether diols (yielding a "polyether TPU"); polyester diols (yielding a "polyester TPU"); hydroxy-terminated polycarbonates (yielding a "polycarbonate TPU"); hydroxy-terminated polybutadienes; hydroxy-terminated polybutadiene-acrylonitrile copolymers; hydroxy-terminated copolymers of dialkyl siloxane and alkylene oxides, such as ethylene oxide, propylene oxide; natural oil diols, and any combination thereof. One or more of the foregoing polymeric diols may be mixed with an amine-terminated polyether and/or an amino-terminated polybutadiene-acrylonitrile copolymer The difunctional chain extender can be aliphatic straight and branched chain diols having from 2 to 10 carbon atoms, inclusive, in the chain. Illustrative of such diols are ethylene glycol, 1,3-propanediol, 1,4-butanediol, 1,5-pentanediol, 1,6-hexanediol, neopentyl glycol, and the like; 1,4-cyclohexanedimethanol; hydroquinonebis-(hydroxyethyl)ether; cyclohexylenediols (1,4-, 1,3-, and 1,2-isomers), isopropylidenebis(cyclohexanols); diethylene glycol, dipropylene glycol, ethanolamine, N-methyl-diethanolamine, and the like; and mixtures of any of the above. As noted previously, in some cases, minor proportions (less than about 20 equivalent percent) of the difunctional extender may be replaced by trifunctional extenders, without detracting from the thermoplasticity of the resulting TPU; illustrative of such extenders are glycerol, trimethylolpropane, and the like.

The chain extender is incorporated into the polyurethane in amounts determined by the selection of the specific reactant components, the desired amounts of the hard and soft segments, and the index sufficient to provide good mechanical properties, such as modulus and tear strength. The polyurethane compositions can contain, for example, from 2 to 25, preferably from 3 to 20 and more preferably from 4 to 18, wt % of the chain extender component.

Optionally, small amounts of monohydroxyl functional or monoamino functional compounds, often termed "chain stoppers," may be used to control molecular weight. Illustrative of such chain stoppers are the propanols, butanols, pentanols, and hexanols. When used, chain stoppers are typically present in minor amounts from 0.1 to 2 weight percent of the entire reaction mixture leading to the polyurethane composition.

The equivalent proportions of polymeric diol to said extender can vary considerably depending on the desired hardness for the TPU product. Generally speaking, the equivalent proportions fall within the respective range of from about 1:1 to about 1:20, preferably from about 1:2 to about 1:10. At the same time the overall ratio of isocyanate equivalents to equivalents of active hydrogen containing materials is within the range of 0.90:1 to 1.10:1, and preferably, 0.95:1 to 1.05:1.

Nonlimiting examples of suitable TPUs include the PELLETHANE™, ESTANE™, TECOFLEX™, TECOPHILIC™, TECOTHANE™, and TECOPLAST™ thermoplastic polyurethanes all available from the Lubrizol Corporation; ELASTOLLAN™ thermoplastic polyurethanes and other thermoplastic polyurethanes available from BASF; and additional thermoplastic polyurethane materials available from Bayer, Huntsman, Merquinsa and other suppliers.

The polyurethane component of the compatibilized blends used in the practice of the invention may contain a combination of two or more TPUs as described above.

The TPUs useful in the practice of this invention are typically used in amounts ranging from 1 to 99 wt % based on the weight of the blend. This includes embodiments in which TPUs are used in amounts ranging from 5 to 75 wt % based on the weight of the blend.

Phenolic Resole Resins

Phenolic resole resins play two roles in the present blends. They crosslink the thermoplastic polyurethanes (e.g., through a dynamic crosslinking process, as described below) and they act as compatibilizers for the olefin polymers and the TPUs in the blend. As a result, the phenolic resins improve the mechanical properties of the blends relative to blends that use more conventional crosslinking agents, such as peroxides. In addition, the phenolic resole resins can have a high limited oxygen index (LOI) (e.g., about 32 to 36) which can improve the flame retardant performance of the blends into which they are incorporated.

As a compatibilizer, the phenolic resole resin helps the olefin polymers and TPUs mix together without objectionable separation so that delamination or derivation problems do not occur in products, such as molded articles, formed from the blends. Delamination can be evidenced by, for example, the lowering of some measured physical property (e.g., tensile strength) to a value below that for either one of the polymer components in the blend, or by the visual observation of separation, such as sample fracture, crumbling, or the like.

The phenolic resole resins are desirably those having benzyl hydroxyl, or methyl hydroxyl, end-groups. Thus, the resole resins can have the following structure:

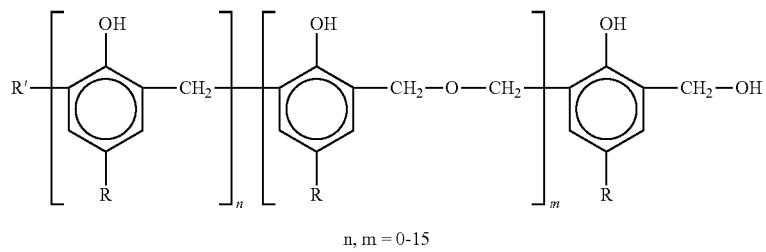

n, m = 0-15 where R' is an H atom, hydroxyl group or $CH_2OH$ group and R is an alkyl group, such as a p-tert octyl group or a p-tert butyl group.

The phenolic resole resin SP-1045, available from SI Group, is an example of a suitable phenolic resole resin. The repeat unit in this phenolic resin is

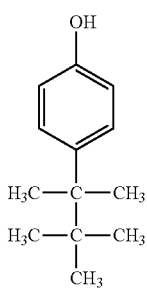

The phenolic resole resins useful in the practice of this invention are typically used in amounts ranging from 0.01 to 20 wt % based on the weight of the blend. This includes embodiments in which TPUs are used in amounts ranging from 0.1 to 10 wt % based on the weight of the blend.

Additional Compatibilizers and Curing Agents

Compatibilizers and curing agents (also called crosslinking agents) in addition to the phenolic resole resin can also be included in the blend.

Additional compatibilizers that can, optionally, be included in the present blends include reactive compatibilizers, such as polyolefins grafted with functional groups that react with polyurethanes. Examples of additional compatibilizers include epoxy-modified polyolefins and hydroxyl-modified non-polar polymers, such as polyolefin homopolymers, random or block copolymers, or polyolefin elastomers, and styrenic copolymers; and amine modified polyolefin homopolymers, random or block copolymers, or polyolefin elastomers. Igetabond™ 2C (ethylene/glycidyl methacrylate (EGMA) with 6 wt % GMA and 94 wt % ethylene), available from Sumitomo, is an example of an additional compatibilizer. Other examples include malic anhydride grafted polypropylene (PP-g-MAH) and hydroxyl grafted polypropylene.

The additional compatibilizers useful in the practice of this invention are typically used in amounts ranging from 0.01 to 15 wt %, based on the weight of the blend. This includes embodiments in which additional compatibilizers are present in amounts ranging from 0.1 to 10 wt %, and further includes embodiments in which additional compatibilizers are present in amounts ranging from 1 to 7.5 wt %, based on the weight of the blend.

Peroxides are an example of an additional curing agent for the TPU that may be included in the blend. Luperox 101, available from Arkema, is an example of a suitable peroxide curing agent.

The additional curing agents useful in the practice of this invention are typically used in amounts ranging from 0.01 to 4 wt %, based on the weight of the blend. This includes embodiments in which additional curing agents are present in amounts ranging from 0.1 to 3 wt %, and further includes embodiments in which additional curing agents are present in amounts ranging from 0.2 to 2 wt %, based on the weight of the blend.

The present compositions can further optionally include one or more curing catalysts (also referred to as a curing accelerator or cure activator) for the phenolic resole resins, or any additional curing agents. Examples of curing catalysts for the phenolic resole resins include Lewis acids, $SnCl_4 \cdot 2H_2O$, and $FeCl_3 \cdot 3H_2O$. Examples of curing catalysts for peroxide curing agents include triallyl isocyanurate (TAIC) or trimethylpropane trimethacrylate (TMPT).

The curing catalysts useful in the practice of this invention are typically used in amounts ranging from 0.01 to 4 wt %, based on the weight of the blend. This includes embodiments in which additional curing catalysts are present in amounts ranging from 0.05 to 2 wt %, and further includes embodiments in which additional curing catalysts are present in amounts ranging from 0.1 to 1 wt %, based on the weight of the blend.

Flame Retardants

Flame retardants can be included in the blends in order to provide flame-retardant compositions. The flame retardants can be organic or inorganic and are desirably halogen-free. "Halogen-free" and like terms mean that the compositions of this invention are without or substantially without halogen content, i.e., contain less than 2000 mg/kg of halogen as measured by ion chromatography (IC) or a similar analytical method. Halogen content of less than this amount is considered inconsequential to the efficacy of the composition as, for example, a wire or cable covering. In some embodiments, the blends satisfy at least one of the UL 94 V0, UL 94 V1 and UL 94 V2 flame retardant standards. "UL-94" is the Underwriters' Laboratory (UL) Bulletin 94 Tests for Flammability of Plastic Materials for Parts in Devices and Appliances.

Organic flame retardants include organic phosphates. Specific examples of organic flame retardants include phosphorus- or nitrogen-based flame retardants. The organic flame retardants can be intumescent flame retardants. An "intumescent flame retardant" is a flame retardant that yields a foamed char formed on a surface of a polymeric material during fire exposure. Phosphorus-based and nitrogen-based intumescent flame retardants that can be used in the practice of this invention include, but are not limited to, organic phosphonic acids, phosphonates, phosphinates, phosphonites, phosphinites, phosphine oxides, phosphines, phosphites or phosphates, phosphorus ester amides, phosphoric acid amides, phosphonic acid amides, phosphinic acid amides, and melamine and melamine derivatives, including melamine polyphosphate, melamine pyrophosphate and melamine cyanurate and mixtures of two or more of these materials. Examples include phenylbisdodecyl phosphate, phenylbisneopentyl phosphate, phenyl ethylene hydrogen phosphate, phenyl-bis-3,5,5'-trimethylhexyl phosphate), ethyldiphenyl phosphate, 2-ethylhexyl di(p-tolyl)phosphate, diphenyl hydrogen phosphate, bis(2-ethyl-hexyl)p-tolylphosphate, tritolyl phosphate, bis(2-ethylhexyl)-phenyl phosphate, tri(nonylphenyl)phosphate, phenylmethyl hydrogen phosphate, di(dodecyl)p-tolyl phosphate, tricresyl phosphate, triphenyl phosphate, triphenyl phosphate, dibutylphenyl phosphate, 2-chloroethyldiphenyl phosphate, p-tolyl bis(2,5,5'-trimethylhexyl)phosphate, 2-ethylhexyldiphenyl phosphate, and diphenyl hydrogen phosphate. Phosphoric acid esters of the type described in U.S. Pat. No. 6,404,971 are examples of phosphorus-based flame retardants. Ammonium polyphosphate is another example. The ammonium polyphosphate is often used with flame retardant co-additives, such as melamine derivatives. Additional co-additives, such as hydroxyl sources, can also be included to contribute to the intumescent flame retardant char forming mechanism. Budenheim and Adeka sell intumescent material blends such as Budenheim Budit™ 3167 (based on ammonium polyphosphate and co-additives) and Adeka FP-2100J (based on piperazine polyphosphate and co-additives).

Preferred intumescent flame retardant additives used in the demonstration of this invention include the ADK STAB FP-2100J (a nitrogen-phosphorous based flame retardant) and a combination of resorcinol diphosphate (Supresta RDP)

and aluminum trihydrate. Other preferred flame retardants include bisphenol A polyphosphate (also known as BAPP or BDP).

Suitable inorganic flame retardants include metal hydroxides, calcium carbonate, silica and mixtures thereof. Particularly useful metal hydroxides are aluminum trihydroxide (also known as ATH or aluminum trihydrate) and magnesium hydroxide (also known as magnesium dihydroxide).

The organic flame retardants useful in the practice of this invention are typically used in amounts ranging from 1 to 40 wt %, based on the weight of the blend. This includes embodiments in which organic flame retardants are present in amounts ranging from 5 to 30 wt %, and further includes embodiments in which organic flame retardants are present in amounts ranging from 5 to 20 wt %, based on the weight of the blend.

The inorganic flame retardants useful in the practice of this invention are typically used in amounts ranging from 1 to 70 wt %, based on the weight of the blend. This includes embodiments in which inorganic flame retardants are present in amounts ranging from 10 to 60 wt %, and further includes embodiments in which inorganic flame retardants are present in amounts ranging from 20 to 50 wt %, based on the weight of the blend.

Additives and Fillers

The blends of this invention can, optionally, also contain additives and/or fillers. Representative additives include, but are not limited to, antioxidants, processing aids, colorants, coupling agents, ultraviolet stabilizers (including UV absorbers), antistatic agents, nucleating agents, slip agents, plasticizers, lubricants, viscosity control agents, tackifiers, anti-blocking agents, surfactants, extender oils, acid scavengers, and metal deactivators. These additives are typically used in a conventional manner and in conventional amounts, e.g., from 0.01 wt % or less to 10 wt % or more based on the weight of the composition.

Representative fillers include but are not limited to the various metal oxides, e.g., titanium dioxide; metal carbonates such as magnesium carbonate and calcium carbonate; metal sulfides and sulfates such as molybdenum disulfide and barium sulfate; metal borates such as barium borate, meta-barium borate, zinc borate and meta-zinc borate; metal anhydride such as aluminum anhydride; clay such as diatomite, kaolin and montmorillonite; huntite; celite; asbestos; ground minerals; and lithopone. These fillers are typically used a conventional manner and in conventional amounts, e.g., from 5 wt % or less to 50 wt % or more based on the weight of the composition.

Suitable UV light stabilizers include hindered amine light stabilizers (HALS) and UV light absorber (UVA) additives. Representative HALS that can be used in the compositions include, but are not limited to, TINUVIN XT 850, TINUVIN 622, TINUVIN® 770, TINUVIN® 144, SANDUVOR® PR-31 and Chimassorb 119 FL. TINUVIN® 770 is bis-(2,2,6,6-tetramethyl-4-piperidinyl)sebacate, has a molecular weight of about 480 grams/mole, is commercially available from Ciba, Inc. (now a part of BASF), and possesses two secondary amine groups. TINUVIN® 144 is bis-(1,2,2,6,6-pentamethyl-4-piperidinyl)-2-n-butyl-2-(3,5-di-tert-butyl-4-hydroxybenzyl)malonate, has a molecular weight of about 685 grams/mole, contains tertiary amines, and is also available from Ciba. SANDUVOR® PR-31 is propanedioic acid, [(4-methoxyphenyl)-methylene]-bis-(1,2,2,6,6-pentamethyl-4-piperidinyl)ester, has a molecular weight of about 529 grams/mole, contains tertiary amines, and is available from Clariant Chemicals (India) Ltd. Chimassorb 119 FL or Chimassorb 119 is 10 wt % of dimethyl succinate polymer with 4-hydroxy-2,2,6,6,-tetramethyl-1-piperidineethanol and 90 wt % of N,N'''-[1,2-Ethanediylbis[[[4,6-bis[butyl(1,2,2,6,6-pentamethyl-4-piperidinyl)amino]-1,3,5-traizin-2-yl] imino]-3,1-propanediyl]]bis[N'N''-dibutyl-N'N''-bis(1,2,2,6,6-pentamethyl-4-piperidinyl)]-1, is commercially available from Ciba, Inc. Representative UV absorber (UVA) additives include benzotriazole types such as Tinuvin 326 and Tinuvin 328 commercially available from Ciba, Inc. Blends of HAL's and UVA additives are also effective.

In some embodiments, the light stabilizers are present in amounts of 0.1 to 5.0 weight percent, based on the total weight of the compositions. This includes embodiments that include 1.0 to 2.0 weight percent of UV light stabilizer additives.

Examples of antioxidants include, but are not limited to, hindered phenols such as tetrakis[methylene(3,5-di-tert-butyl-4-hydroxyhydro-cinnamate)]methane; bis[(beta-(3,5-di-tert-butyl-4-hydroxybenzyl)-methylcarboxyethyl)]sulphide, 4,4'-thiobis(2-methyl-6-tert-butylphenol), 4,4'-thiobis(2-tert-butyl-5-methylphenol), 2,2'-thiobis(4-methyl-6-tert-butylphenol), and thiodiethylene bis(3,5-di-tert-butyl-4-hydroxy)hydrocinnamate; phosphites and phosphonites such as tris(2,4-di-tert-butylphenyl)phosphite and di-tert-butylphenyl-phosphonite; thio compounds such as dilaurylthiodipropionate, dimyristylthiodipropionate, and distearylthiodipropionate; varioussiloxanes; polymerized 2,2,4-trimethyl-1,2-dihydroquinoline, n,n'-bis(1,4-dimethylpentyl-p-phenylenediamine), alkylated diphenylamines, 4,4'-bis (alpha, alpha-dimethylbenzyl)diphenylamine, diphenyl-p-phenylenediamine, mixed di-aryl-p-phenylenediamines, and other hindered amine anti-degradants or stabilizers. Antioxidants can be used, for example, in amounts of 0.1 to 5 wt % based on the weight of the composition.

Examples of processing aids include, but are not limited to, metal salts of carboxylic acids such as zinc stearate or calcium stearate; fatty acids such as stearic acid, oleic acid, or erucic acid; fatty amides such as stearamide, oleamide, erucamide, or N,N'-ethylene bis-stearamide; polyethylene wax; oxidized polyethylene wax; polymers of ethylene oxide; copolymers of ethylene oxide and propylene oxide; vegetable waxes; petroleum waxes; non ionic surfactants; silicone fluids and polysiloxanes. Processing aids can be used, for example, in amounts of 0.05 to 5 wt % based on the weight of the composition.

Mechanical Properties

The present blends can be characterized by their tensile strength at break (in MPa), elongation at break (%), volume resistance (in Ω*cm) and/or melt flow rates (MFRs).

Tensile strength and elongation can be measured in accordance with the ASTM D-638 testing procedure on compression molded samples prepared according to ASTM D4703. Elongation at break, or elongation to break, is the strain on a sample when it breaks. It usually is expressed as a percent.

Some embodiments of the present blends have tensile strengths at break of at least 10 MPa. This includes blends having tensile strength at break of at least 15 MPa and further includes blends having a tensile strength at break of at least 20 MPa.

Some embodiments of the present blends have an elongation at break of at least 100%. This includes blends having an elongation at break of at least 200%, further includes blends having an elongation at break of at least 400% and still further includes blends having an elongation at break of at least 600%.

Some embodiments of the present blends have a volume resistivity of at least $1 \times 10^{15}$ Ωcm. This includes blends having a volume resistivity of at least $2 \times 10^{15}$ Ωcm. For the purposes of this disclosure, volume resistivity is measured in accordance with ASTM D257.

Compounding

The present blends can be made by dynamically crosslinking polyurethane polymers to form a co-continuous or discontinuous phase in an olefin polymer matrix. During dynamic vulcanization, a vulcanizable elastomer is dispersed into a resinous thermoplastic polymer and the elastomer is crosslinked in the presence of a crosslinking agent while continuously mixing and shearing the blend. During the crosslinking of the elastomer, the viscosity of the elastomer phase increases, causing the viscosity ratio of the blend to increase. The shear stress causes the elastomer phase to form dispersed particles in the thermoplastic matrix. Alternatively, if the crosslinking density of the elastomeric phase is not sufficiently high, the elastomeric phase can remain co-continuous with the thermoplastic matrix.

The examples below provide examples of methods of forming blends via a dynamic vulcanization process. Briefly, these methods entail blending an olefin polymer, a thermoplastic polyurethane and a phenolic resole resin with continuous mixing. In one embodiment, the olefin polymer and the polyurethane are first mixed with an additional compatibilizer at an elevated temperature and the phenolic resole resin is subsequently added to the mixer. The resulting mixture is then mixed at the elevated temperature for a time sufficient to allow the phenolic resole resin to crosslink the polyurethane. Flame retardants, cure catalysts and optional additives can also be added to the mixture during the mixing process. The blends can be made without the use of liquid materials, resulting in easy processability.

The use of a polymerized TPU as a raw material for forming the dynamically crosslinked second phase of the present blends is desirable compared to the use of urethane pre-polymers because such pre-polymers create potential environmental issues.

Compounding of the blends can be effected by standard equipment known to those skilled in the art. Examples of compounding equipment are internal batch mixers, such as a Banbury™ or Bolling™ internal mixer. Alternatively, continuous single, or twin screw, mixers can be used, such as a Farrel™ continuous mixer, a Werner and Pfleiderer™ twin screw mixer, or a Buss™ kneading continuous extruder. The type of mixer utilized, and the operating conditions of the mixer, will affect properties of the composition such as viscosity, volume resistivity, and extruded surface smoothness.

Articles

Another aspect of the invention provides articles, such as molded or extruded articles, comprising one or more blends of present invention.

Articles include cable jackets and wire insulation. Thus, in some embodiments, the article includes a metal conductor and a coating on this metal conductor to provide an "insulated" wire capable of electrical transmission of low voltage telecommunication signals or for a wide range of electrical power transmission applications. A "metal conductor," as used herein, is at least one metal component used to transmit either electrical power and/or electrical signals. Flexibility of wire and cables is often desired, so the metal conductor can have either a solid cross-section or preferentially can be composed of smaller wire strands that provide increased flexibility for the given overall conductor diameter. Cables are often composed of several components such as multiple insulated wires formed into an inner core, and then surrounded by a cable sheathing system providing protection and cosmetic appearance. The cable sheathing system can incorporate metallic layers such as foils or armors, and typically has a polymer layer on the surface. The one or more polymer layers incorporated into the protective/cosmetic cable sheathing are often referred to cable "jacketing". For some cables, the sheathing is only a polymeric jacketing layer surrounding a cable core. There are also some cables having a single layer of polymer surrounding the conductors, performing both the roles of insulation and jacketing. The present blends may be used as, or in, the polymeric components in a full range of wire and cable products, including power cables and both metallic and fiber optic communication applications. Use includes both direct contact and indirect contact between the coating and the metal conductor. "Direct contact" is a configuration whereby the coating immediately contacts the metal conductor, with no intervening layer(s) and/or no intervening material(s) located between the coating and the metal conductor. "Indirect contact" is a configuration whereby an intervening layer(s) and/or an intervening material(s) is located between the metal conductor and the coating. The coating may wholly or partially cover or otherwise surround or encase the metal conductor. The coating may be the sole component surrounding the metal conductor. Alternatively, the coating may be one layer of a multilayer jacket or sheath encasing the metal conductor.

In another embodiment, the blends can be used as a layer or component in fiber optic cables which incorporate optical fibers transmitting light energy. These cables are typically used in communication applications, and are capable of transmitting large quantities of data. For optic cable jacketing, the polymeric coating provides many of the same protective benefits as metallic-based cables, providing a tough protective layer with good cosmetic appearance, and having any required level of burn resistance.

Nonlimiting examples of suitable coated metal conductors include wiring for consumer electronics, a power cable, a power charger wire for cell phones and/or computers, computer data cords, power cords, appliance wiring material, and consumer electronic accessory cords.

A cable containing an insulation layer comprising a blend of this invention can be prepared with various types of extruders, e.g., single or twin screw types. These blends should have extrusion capability on any equipment suitable for thermoplastic polymer extrusion. The most common fabrication equipment for wire and cable products is a single screw plasticating extruder. A description of a conventional single screw extruder can be found in U.S. Pat. No. 4,857,600. An example of co-extrusion and an extruder therefore can be found in U.S. Pat. No. 5,575,965. A typical extruder has a hopper at its upstream end and a die at its downstream end. Granules of the polymeric blend feed through a hopper into the extruder barrel, which contains a screw with a helical flight. The length to diameter ratio of extruder barrel and screw is typically in the range of about 15:1 to about 30:1. At the downstream end, between the end of the screw and the die, there is typically a screen pack supported by a breaker plate used to filter any large particulate contaminates from the polymer melt. The screw portion of the extruder is typically divided up into three sections, the solids feed section, the compression or melting section, and the metering or pumping section. The granules of the polymer are conveyed through the feed zone into the compression zone, where the depth of the screw channel is reduced to compact the material, and the thermoplastic polymer is fluxed by a combination of heat input from the extruder barrel, and frictional shear heat generated by the screw. Most extruders have multiple barrel heating zones (more than two) along the barrel axis running from upstream to downstream. Each heating zone typically has a separate heater and heat controller to allow a temperature profile to be established along the length of the barrel. There are additional heating zones in the crosshead and die assembles, where the pressure generated by the extruder screw causes the melt to flow and be shaped into the wire and cable product which typically moves perpendicular to the extruder barrel. After shaping, thermoplastic extrusion lines typically have a water trough to cool and solidify the polymer into the final wire or cable product, and then have reel take-up systems to collect long lengths of this product. There are many variations of the wire and cable fabrication process, for example, there are alternate types of screw designs such as barrier mixer or other types, and alternate processing equipment such as a polymer gear pump to generate the discharge pressure.

The following examples illustrate various embodiments of this invention. All parts and percentages are by weight unless otherwise indicated.

SPECIFIC EMBODIMENTS

The following examples illustrate embodiments of methods for making blends in accordance with the present invention.

Materials:

Table 1 provides a list of the raw materials used in the examples, along with their manufacturers, MFR values, and densities, where applicable.

TABLE 1

| Raw materials | MFR, dg/min ASTM D-1238 | Density, g/cm$^3$ ASTM D-792 | Producer |
|---|---|---|---|
| TPU (Pellethane ™ 201-90AE) | 5 (190° C./8.7 kg) | 1.12 | Lubrizol |
| Phenolic resole resin SP-1045 | — | — | SI. Group |
| Igetabond ™ 2C (EGMA, Ethylene/glycidyl methacrylate with 6 wt % GMA, 94 wt % ethylene) | 3$^1$ | | Sumitomo |
| HDPE DGDB2480 | 0.75$^1$ | 0.942 | Sinopec Qilu Company |
| HDPE 12450N | 12$^1$ | 0.95 | Dow Chemical |
| Aluminum trihydrate (ATH) | — | — | Showa Kako |
| FP-600 (Bisphenol-A bis(diphenyl phosphate), BDP) | — | — | Adeka |
| PP-g-MAH (1 wt % MAH grafted hPP) | >80$^1$ | 0.9 | Rizhisheng Company |
| PP-g-OH | Made in accordance with example 2, below. | | |
| VERSIFY ™ DE 2300 | 2$^2$ | 0.866 | Dow Chemical |
| Ethanolamine | | | SCRC |
| Triallyl isocyanurate (TAIC) | | | Hunan Liuyang Chemical Company |
| SEPTON ™ HG252 (SEEPS-OH) | 26$^2$ | — | Kuraray |

$^1$ASTM 1238 (190° C./2.16 kg)
$^2$ASTM 1238 (230° C./2.16 kg)

Pellethane 201-90AE is a TPU-polyether from Lubrizol Corporation. VERSIFY DE2300 is a propylene-ethylene copolymer. Phenolic resin (Resole) SP-1045 is a phenolic resole resin having a repeat unit structure as follows:

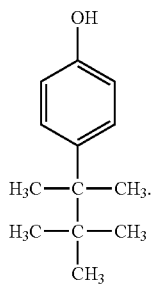

Characterization:

The following tests were used to characterize the properties of the blends.

Tensile Testing:

Granules made from the blends were formed into sample sheets for tensile testing via compression molding. The sample sheets were compression molded at 180° C. for 10 minutes in accordance with ASTM D4703. The sheets were cut into bell-shape specimens. The tensile strength at break and the elongation at break are measured according to ASTM D638, using a nominal Type C specimen punched using a bell shaped cutter from the 90 mm wide molded sheet having a nominal 1.44 mm thickness. The tensile testing is performed on a INSTRON 5566 Tensile Tester at a testing speed of 500 mm/minute with video camera to record the strain.

Flame Retardance:

The flame retardance of the blends was measured according to the VW-1 standard. "VW-1" is an Underwriters' Laboratory (UL) flame rating for wire and sleeving. It denotes "Vertical Wire, Class 1", which is the highest flame rating a wire or sleeve can be given under the UL 1441 specification. The test is performed by placing the wire or sleeve in a vertical position. A flame is set underneath it for a period of time, and then removed. The characteristics of the sleeve are then noted. The VW-1 flame test is determined in accordance with Method 1080 of UL-1581. In the present experiments, simulated VW-1 testing is conducted in a UL-94 chamber. The specimen is hanged on a clamp, with its longitudinal axis vertical by applying a 50 g load on to its lower end. A paper flag (2*0.5 cm) is placed on the top of the wire. The distance between the flame bottom (highest point of the burner oracle) and the bottom of flag is 18 cm. The flame is applied continuously for 45 sec. After flame time (AFT), uncharred wire length (UCL) and uncharred flag area percentage (flag uncharred) are recorded during and after combustion. Four or five specimen are tested for each sample. Any of the following phenomenons will result in a rating of "not pass": (1) the cotton under the specimen is ignited; (2) the flag is burned out; or (3) dripping with flame is observed.

Morphology:

The morphology of the blends was measured using cryo-microtomy, atomic force microscopy and optical microscopy.

Cryo-Microtomy. Specimens for microtomy are cut by a razor blade. The isolated pieces are razor trimmed to an appropriate size for cryo-microtomy. Cross sections of the specimens are polished with a diamond knife at −120° C. on a Leica UC6 microtome equipped with an FC6 cryo-sectioning chamber. Microtome sections cut in the cross machine direction (CMD) are selected and polished at the same time for scanning.

Atomic Force Microscopy (AFM). AFM images are obtained on a Nanoscope V using a Dimension V Large Sample AFM (Veeco, Inc.) and hybrid scanner head. The microscope is outfitted with coaxial zoom optics for reflected light imaging up to about 1000× magnification. The microscope is operated in the Tapping Mode™ (trademark of Veeco) where the lever is oscillated at resonance and the feedback control adjusts for constant tapping amplitude. Scanning is carried out in air using commercially available silicon cantilevers and tips with nominal force constants of 48 N/m (LTESPW Tapping mode etched silicon probes). Estimated normal scanning forces under these conditions are in the $10^{-8}$ to $10^{-9}$ N range. The digital images have 512×512 pixels. The digital images are pseudo-colored according to measured properties (height, amplitude, and phase). The initial amplitude of the oscillating probe (A0) is 2000 mv and the set point amplitude (Asp) is 1300 mv~1500 mv.

Example 1

In this example, three inventive blends and three comparative blends are formulated according to the formulations shown in Table 2.

TABLE 2

| Formulations | Inventive blend 1 | Comp. blend 1 | Inventive blend 2 | Comp. blend 2 | Inventive blend 3 | Comp. blend 3 |
|---|---|---|---|---|---|---|
| Pellethane 2103-90AE | 25 | 25 | 25 | 25 | 25 | 25 |
| Phenolic resole resin SP-1045 | 2.5 | | 2.5 | | 2.5 | |
| HDPE DGDB2480 | 20 | 20 | | | | |
| HDPE 12450N | | | 20 | 20 | | |
| VERSIFY DE 2300 | | | | | 20 | 20 |
| EGMA 2C | 5 | 5 | 5 | 5 | | |
| SEEPS-OH | | | | | 5 | 5 |
| Properties | | | | | | |
| Tensile Strength at break, MPa | 26.1 | 18.4 | 19.1 | 14.5 | 23.4 | 20.3 |
| Elongation at break, % | 608 | 319 | 400 | 127 | 624 | 453 |
| Volume resistance, pv (Ω * cm) | $2.97 * 10^{15}$ | $1.24 * 10^{13}$ | — | — | — | — |

To formulate the blends, the TPU, polyolefin and additional compatibilizer are fed into a Haake mixer at 190° C. for about 5 minutes. The phenolic resole resin is then added into the mixer. The rotor speed is kept at 80 rpm and held for 3-15 minutes to allow TPU crosslinking. The melt is then cooled to room temperature and removed for testing.

Inventive blends 1 and 2, and comparative blends 1 and 2 use HDPEs with different MFR values as the continuous olefin polymer. The inventive blends 1-3 use a phenolic resole resin to dynamically crosslink the TPU which exists as a non-continuous phase dispersed in the polyolefin continuous phase. Inventive blend 1 provides surprisingly improved tensile strength, elongation at break and volume resistance relative to the comparative blends.

Inventive blend 3 and comparative blend 3 use VERSIFY DE 2300 as the olefin polymer. Like inventive blends 1 and 2, inventive blend 3 uses a phenolic resole resin to dynamically crosslink the TPU which exists as a non-continuous phase dispersed in the polyolefin elastomer continuous phase. Compared to comparative blend 3, inventive blend 3 exhibits remarkably improved tensile strength and elongation at break.

Example 2

In this example, three additional inventive blends and one additional comparative blend are formulated according to the formulations shown in Table 3. Unlike the blends in Example 1, above, the blends in this example include PP-g-OH and/or PP-g-MAH compatibilizers, as well as organic and inorganic flame retardants.

TABLE 3

| | Inventive blend 4 | Comparative blend 4 | Inventive blend 5 | Inventive blend 6 |
|---|---|---|---|---|
| Formulations | | | | |
| Pellethane 2103-90AE | 11.05 | 11.05 | 11.7 | 11.05 |
| SP-1045 | 2 | | 1.37 | 1 |
| VERSIFY DE 2300 | 8 | 8 | 8 | 8 |
| PP-g-MAH | 1.5 | 1.5 | 1.5 | |
| PP-g-OH | 2.5 | 2.5 | 2.5 | 4 |
| ATH | 30 | 30 | 30 | 31 |
| BDP | 11.05 | 11.05 | 11.05 | 11.05 |
| Properties | | | | |
| Tensile Strength at break, MPa | 11 | 7.8 | 11.1 | 8.2 |
| Elongation at break, % | 208 | 35 | 186 | 93 |
| Mimic VW-1 (Pass/Total) | 5/6 | 4/6 | 5/5 | 4/5 |
| MFR ASTM D-1238 (190° C., 10 kg) | 30 | >100 | 93.5 | 225 |

The blends of Table 3 are formulated by adding the TPU, the polyolefin and the additional compatibilizer to a Haake mixer at 190° C. for about 3 minutes. After the resulting polymer composition melts, a mixture of BDP and ATH flame retardants is added into the mixer and mixed for another 3 minutes. Then the phenolic resole resin is added into the mixer. The rotor speed is kept at 80 rpm, the temperature is raised to above 195° C., and held 3-15 minutes to allow crosslinking. The melt is then cooled to room temperature and removed for testing.

The PP-g-MAH is a commercial product with 1% MAH grafted onto hPP (available from Rizhisheng Company). Fifty grams of the PP-g-MAH is fed into a Haake mixer at 170° C. at a rotor speed of 50 rpm. After the PP-g-MAH melts, a stoichiometric quantity of ethanolamine is added and mixed for 3 minutes to form the PP-g-OH. The melt is then cooled to room temperature and removed for later use.

As shown in Table 3, inventive blends 4, 5 and 6 are flame-retardant composites comprising crosslinked TPU domains in an olefin polymer matrix. The phenolic resole resin content of each blend is different. Comparative blend 4 is a flame-retardant composite comprising uncrosslinked TPU and an olefin polymer. The results show that by dynamically crosslinking the TPU using a phenolic resole resin, inventive blends 4, 5 and 6 are able to pass the VW-1 test and, at the same time, afford dramatically improved mechanical properties. In addition, some specimens for comparative blend 4 show slight dripping during the combustion tests. In contrast, there is no dripping during the combustion of any of the specimens corresponding to inventive blend 4. The results also show that inventive blends with a higher phenolic resole resin content can provide better mechanical properties. The results further show that inventive blends 4 and 5, which include both PP-g-MAH and PP-g-OH, exhibit better mechanical properties than inventive blend 6, which includes only PP-g-OH. The reason may be that the combination of PP-g-MAH and PP-g-OH affords better compatibility for the composite, whereby PP-g-MAH is able to compatiblize ATH and the olefin polymer and PP-g-OH is able to compatiblize the TPU and the olefin polymer in the composite.

The morphologies of inventive blends 4 and 6, and comparative blend 4 were studied by AFM and optical microscopy. Inventive blend 4 in which the TPU is dynamically crosslinked by the phenolic resins, has a more homogenous dispersion than comparative blend 4 in which the TPU is not dynamically crosslinked. In addition the domain sizes for inventive blends 4 and 6 and comparative blend 4 become smaller as the content of phenolic resole resin increases from 0 to 2 wt %, based on the total weight of the blend. This indicates that the phenolic resole resin also acts as a compatibilizer for the TPU and olefin polymer in the blends. This may be due to the large R group of the resole resin (p-tert. octyl group).

All references to the Periodic Table of the Elements refer to the Periodic Table of the Elements published and copyrighted by CRC Press, Inc., 2003. Also, any references to a Group or Groups shall be to the Group or Groups reflected in this Periodic Table of the Elements using the IUPAC system for numbering groups. Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of synthetic techniques, product and processing designs, polymers, catalysts, definitions (to the extent not inconsistent with any definitions specifically provided in this disclosure), and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, tensile strength, elongation at break, etc., is from 100 to 1,000, then the intent is that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the amounts of polyolefin, TPU, phenolic resin and additives in the composition, and the various characteristics and properties by which these components are defined.

As used with respect to a chemical compound, unless specifically indicated otherwise, the singular includes all isomeric forms and vice versa (for example, "hexane", includes all isomers of hexane individually or collectively). The terms "compound" and "complex" are used interchangeably to refer to organic-, inorganic- and organometal compounds.

The term "or", unless stated otherwise, refers to the listed members individually as well as in any combination.

Although the invention has been described in considerable detail through the preceding description, drawings and examples, this detail is for the purpose of illustration. One skilled in the art can make many variations and modifications without departing from the spirit and scope of the invention as described in the appended claims.

The invention claimed is:

1. A compatibilized blend comprising:
   (a) a continuous phase comprising a thermoplastic olefin polymer matrix; and
   (b) a dispersed phase comprising domains of a thermoplastic polyurethane crosslinked with a phenolic resole resin dispersed as a discontinuous phase in the continuous phase, the phenolic resole resin having the following structure:

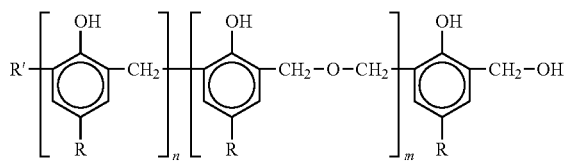

wherein n and m=0-15, R' is an H atom or a $CH_2OH$ group and R is an alkyl group.

2. The blend of claim 1, in which the thermoplastic olefin polymer is a non-polar olefin polymer.

3. The blend of claim 1 further comprising at least one flame retardant.

4. The blend of claim 1 further comprising at least one additional compatibilizer.

5. The blend of claim 1 comprising 5 to 75 weight percent thermoplastic olefin polymer, based on the total weight of the blend, 5 to 75 weight percent thermoplastic polyurethane, based on the total weight of blend, and 0.1 to 10 weight percent phenolic resole resin, based on the total weight of blend.

6. The blend of claim 1, in which the thermoplastic olefin polymer is an ethylene-based polymer.

7. An article comprising the blend of claim 1.

8. A method of making the compatibilized blend of claim 1, the method comprising mixing the thermoplastic olefin polymer, the thermoplastic polyurethane and the phenolic resole resin and crosslinking the thermoplastic polyurethane with the phenolic resole resin with continuous mixing.

9. The method of claim 8, further comprising mixing a functionalized olefin compatibilizer with the thermoplastic olefin polymer, the thermoplastic polyurethane and the phenolic resole resin.

* * * * *